United States Patent [19]
Albright

[11] 3,986,804
[45] Oct. 19, 1976

[54] INJECTION MOLDING HEAD FOR FILLING RUNNERLESS MOLDS

[75] Inventor: Pierce E. Albright, Muncie, Ind.

[73] Assignee: Automated Machinery Corporation, Muncie, Ind.

[22] Filed: May 15, 1974

[21] Appl. No.: 470,039

Related U.S. Application Data

[63] Continuation of Ser. No. 279,490, Aug. 10, 1972, abandoned.

[52] U.S. Cl. .............................. 425/190; 264/329; 425/246; 425/451.9; 425/DIG. 221
[51] Int. Cl.² ........................................... B29F 1/08
[58] Field of Search .......... 425/245, 246, 248, 250, 425/261, DIG. 228, 247, DIG. 51, 190, 191, 192, DIG. 223, 188, 225, 226, 453, 454, 451.9, 242 R, DIG. 221; 249/107, 109; 264/297, 328, 329

[56] References Cited
UNITED STATES PATENTS

| | | | |
|---|---|---|---|
| 2,471,683 | 5/1949 | Halbach | 425/248 |
| 2,658,237 | 11/1953 | Cuppett et al. | 425/250 X |
| 3,137,038 | 6/1964 | Maynard | 425/245 X |
| 3,161,525 | 12/1964 | Hey | 249/109 X |
| 3,195,186 | 7/1965 | Gauban et al. | 425/DIG. 221 |
| 3,252,184 | 5/1966 | Ninneman | 425/250 X |
| 3,321,806 | 5/1967 | Beebee | 425/250 X |
| 3,663,145 | 5/1972 | Teraoka | 425/250 |
| 3,669,596 | 6/1972 | Savory | 425/192 |
| 3,740,179 | 6/1973 | Schmidt | 425/192 |
| 3,812,228 | 5/1974 | Skoroszewski | 264/329 X |
| 3,819,313 | 6/1974 | Josephsen et al. | 425/245 X |
| 3,888,616 | 6/1975 | Ulmschneider et al. | 425/246 |

FOREIGN PATENTS OR APPLICATIONS

| | | | |
|---|---|---|---|
| 994,417 | 4/1951 | France | 425/245 |
| 45-30589 | 10/1970 | Japan | 425/246 |

*Primary Examiner*—Francis S. Husar
*Assistant Examiner*—Mark Rosenbaum
*Attorney, Agent, or Firm*—Woodard, Weikart, Emhardt & Naughton

[57] ABSTRACT

Multi-cavity molds, comparatively small in size and stick-like in shape, are passed through mold inspection station, mold locking station, preheating station, a first orientation station, a molding station, a second orientation station, a curing station, an unlocking station, a molded product ejection station, an insert loading station, and to the inspection station again. The molding station provides means for temperature control of a runner and shothead, facilitating use of thermoset materials, with provision for easy cleaning thereof. Insert loading apparatus is employed where the mold product is to include an insert or inserts.

19 Claims, 21 Drawing Figures

U.S. Patent  Oct. 19, 1976  Sheet 1 of 12  3,986,804

# INJECTION MOLDING HEAD FOR FILLING RUNNERLESS MOLDS

This is a continuation, of application Ser. No. 279,490, filed Aug. 10, 1972, now abandoned.

BACKGROUND OF THE INVENTION

1. Field of the Invention

The invention relates generally to molding equipment for flowable materials, and more particularly to apparatus particularly well suited to handling of thermoset plastics, for example.

2. Description of the Prior Art

There is much prior art in the field of molding apparatus. That of which I am aware and which is in some respect more or less related to my present invention and described in patents is listed in my aforementioned application.

Because of problems associated with molding plastic materials, particularly where thermoset materials are to be used for the plastic molded parts, I have analyzed the problems and outlined solutions according to my invention as follows:

1. Runnerless tooling eliminating runner scrap,
2. Separation of injection from pre-heat and curing time,
3. Minimize tooling complexity and expense,
4. Protection of parts;
5. Attainment of high production rates;
6. Elimination of operator hazard of reaching into open molds of conventional types for insert loading.

SUMMARY OF THE INVENTION

Described briefly, in a typical embodiment of the present invention, a plurality of generally stick-shaped molds is transferred from a mold closing station through a mold pre-heating area, an orientation station, molding station, an orientation station, a curing area, all in sequence, and then to an opening station. Insert loading apparatus is disposed between the opening station and the closing station and is synchronized with this equipment, to accommodate and facilitate production of products having inserts in the molded material.

A molding head is employed which is particularly well adapted to use of thermoset materials, and includes a pre-heated endless runner plate, with a faster means to facilitate cleaning thereof and minimizing chances of the material curing therein during normal operation. Short sprues are employed in implementing this.

The invention includes means facilitating the handling of the molds and parts, and the loading and unloading thereof. The molds are comparatively small and elongated, and contain cavities therein.

DESCRIPTION OF THE PREFERRED EMBODIMENT

Figure 1:
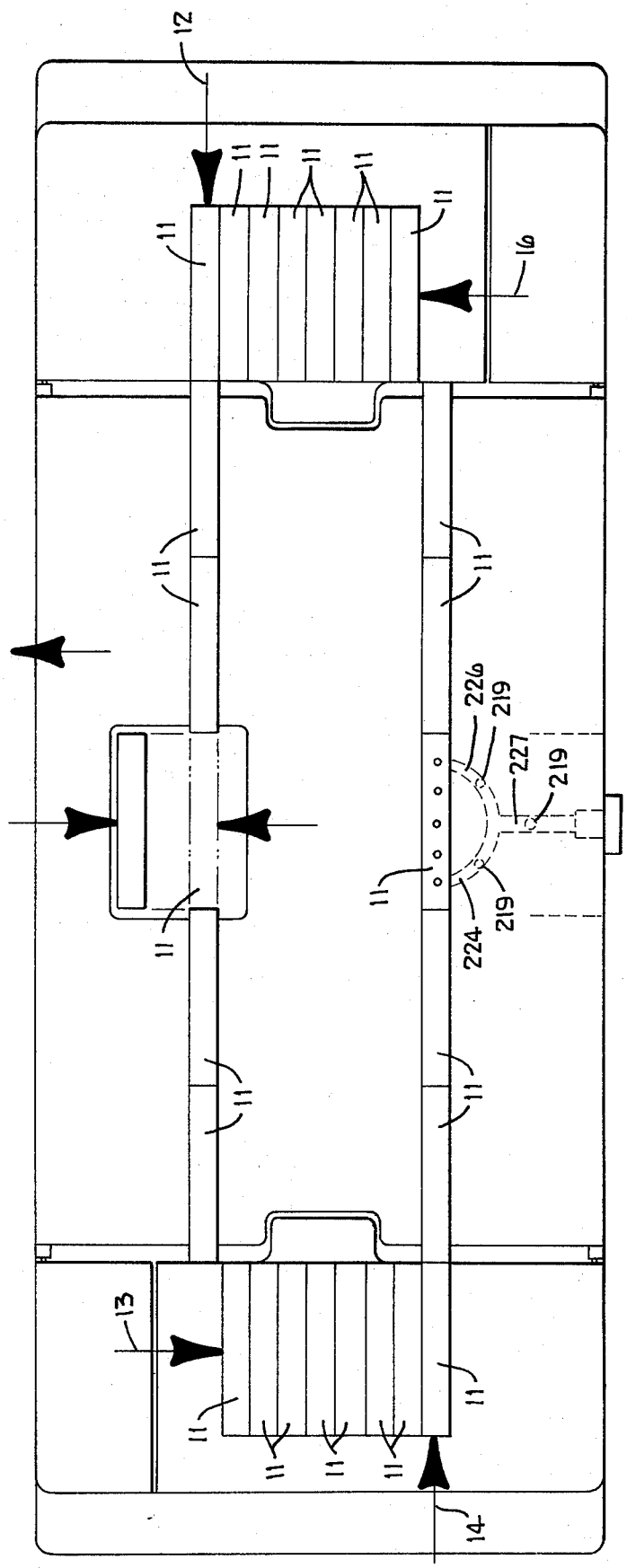
FIG. 1 is a schematic top plan view of the basic molding apparatus according to a typical embodiment of the present invention.

Referring now to FIG. 1, there are twenty-six stick-like molds of the type shown in FIGS. 2 through 6. These molds are given reference numeral 11. Arrow 12 symbolically represents a transfer device and the direction of movement of the molds thereby toward the left through unlocking, opening, insert loading, closing, and locking stations. Arrow 13 similarly represents another transfer device for moving the molds through a pre-heat area. Arrow 14 represents a transfer device for moving six molds longitudinally to the right, through the orientation, molding, and reorientation stations. Arrow 16 represents a transfer device for lateral transfer of molds through a curing station back to alignment with the first-mentioned transfer device 12 which moves them individually to the left.

Figure 2:
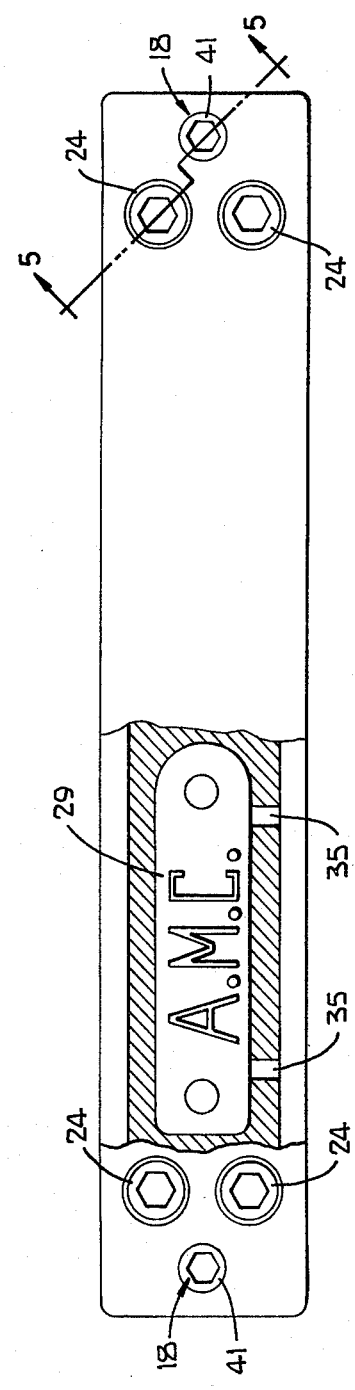
FIG. 2 is an enlarged top plan view of a typical mold employed in the practice of the present invention.
Figure 3:
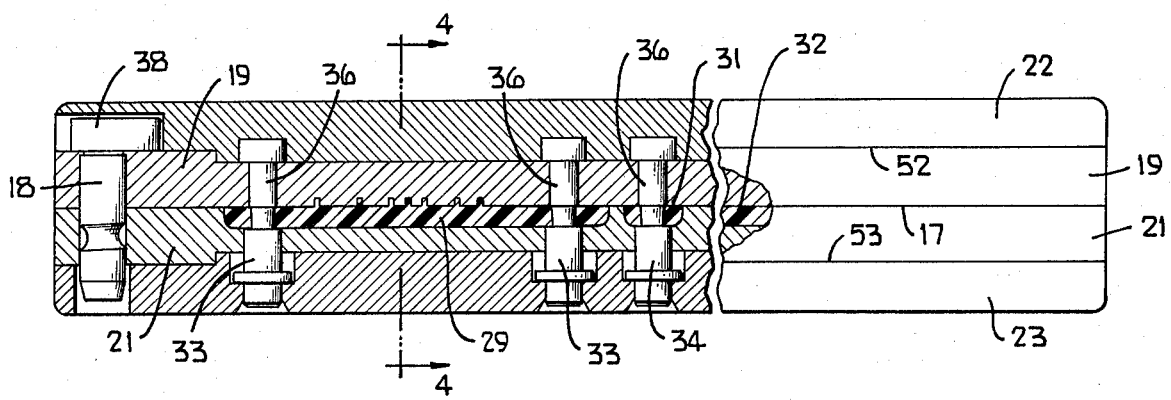
FIG. 3 is a side elevational view of the mold of FIG. 2, on the same scale, with a portion broken away to conserve space in the drawing and a portion shown in section to illustrate interior details.
Figure 4:
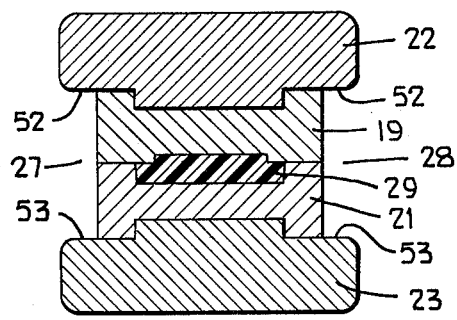
FIG. 4 is a further enlarged cross section taken at line 4—4 in FIG. 3 and viewed in the direction of the arrows.
Figure 5:
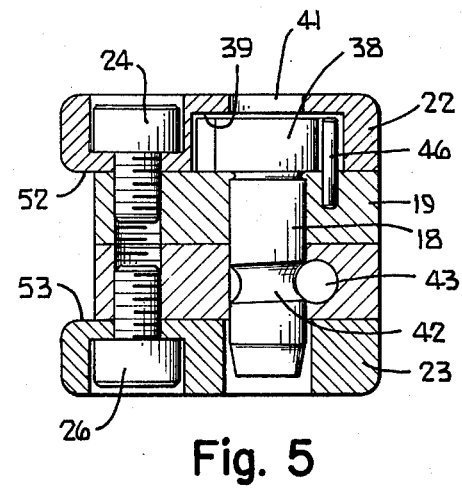
FIG. 5 is a section on the same scale as FIG. 4 and taken at line 5—5 in FIG. 2 and viewed in the direction of the arrows and illustrating the mold locking screw in the locked condition.
Figure 6:
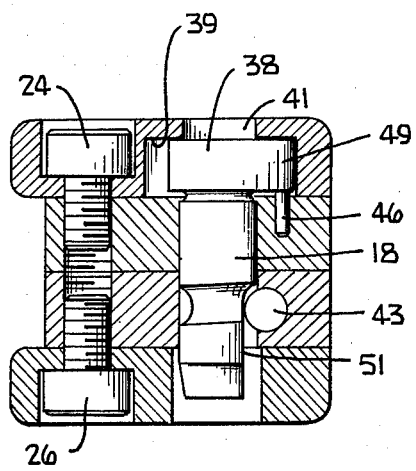
FIG. 6 is a section like FIG. 5 but showing the locking screw in unlocked condition.
Figure 7:
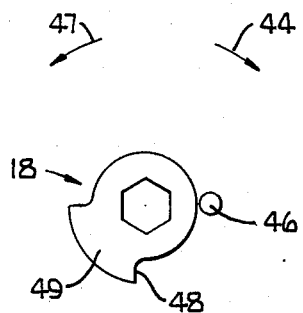
FIG. 7 is a top view of the screw itself in the locked condition as shown in FIG. 5.

Referring now particularly to FIG. 2 through 7, an example of the molds employed according to a typical embodiment of the present invention, is illustrated. Typcially this mold is of a block I shaped and otherwise generally rectangular cross section as best shown in FIGS. 4 through 6, and may be approximately one inch square in cross section and of approximately a one inch dimension on each side of the square, and approximately six inches long. It will be readily recognized that larger (or possibly smaller) dimensions may be employed in the practice of the invention, and the apparatus is constructed and arranged such that in any given machine, suitable adjustments may be made to accommodate molds two inches square or more, in a cross section, and eight inches or more in length. It will be seen that numerous alternatives are possible.

Basically the mold incorporates a lower half and an upper half meeting each other at the line 17 and secured together by a pair of lock pins 18 having hexagonal sockets in the upper ends thereof to receive lock and unlock tools. The upper half and lower half include cavity pieces 19 and 21 which are secured respectively to the cover 22 and base 23 by four screws 24 and four screws 26, respectively. While the top and bottom of the mold are flat, the sides are grooved as indicated at 27 and 28 due to the recessed nature of the cavity pieces, thus providing the I shape, and for a purpose to be described hereinafter. In the illustrated embodiment, there are only three cavities in the mold, two large ones and a small one. As shown in FIGS. 2 and 3, in one of the large cavities, there is a molded part shown at 29 with raised lettering on the top thereof. Molded part 31 is in the small cavity, and a portion of molded part 32 in the other large cavity is shown in FIG. 3. Ejector pins are provided at 33 for part 29 and at 34 for part 31. They would likewise be provided for part 32. Similarly, core pins 36 are provided in the cover half of the mold for coring the holes in the molded parts. Gate openings are provided at 35 (FIG. 2).

Each lock pin 18 includes a head 38 supported atop cavity piece 19 and confined under the surface 39 of the cover 22, where that surface surrounds the tool admitting aperture 41, in the cover. The pin includes a helical groove 42 engaging a horizontal pin 43 affixed in the lower cavity piece 21. Pin 43 serves as a sort of thread and may be referred to as a "thread pin". Therefore, as the lock pin is turned clockwise in the direction of arrow 44 in FIG. 7, the cover half and ejector half of the mold are tightened together. A stop pin 46 serves as a limit of pin rotation in the loosening direction. Turning the lock pin 18 counterclockwise in the direction of arrow 47 in FIG. 7 will loosen the assembly and, upon arrival of the abuttment surface 48 of the pin head lug 49 against stop pin 46, a flat face 51 of the lock pin as shown in FIG. 6 will be aligned with the thread pin 43 and permit separation of the cover half of the mold (cavity piece 19 and cover 22) from the ejector half of the mold (cavity piece 21 and base 23). The separation of the two halves is facilitated by the grooves 27 and 28, the upper margin of which is defined by the flanges 52 on the cover half, and the lower margin of which is defined by the flange 53 on the ejector half. These flanges and the grooves formed thereby serve other useful purposes as will be noted below.

Figure 8:
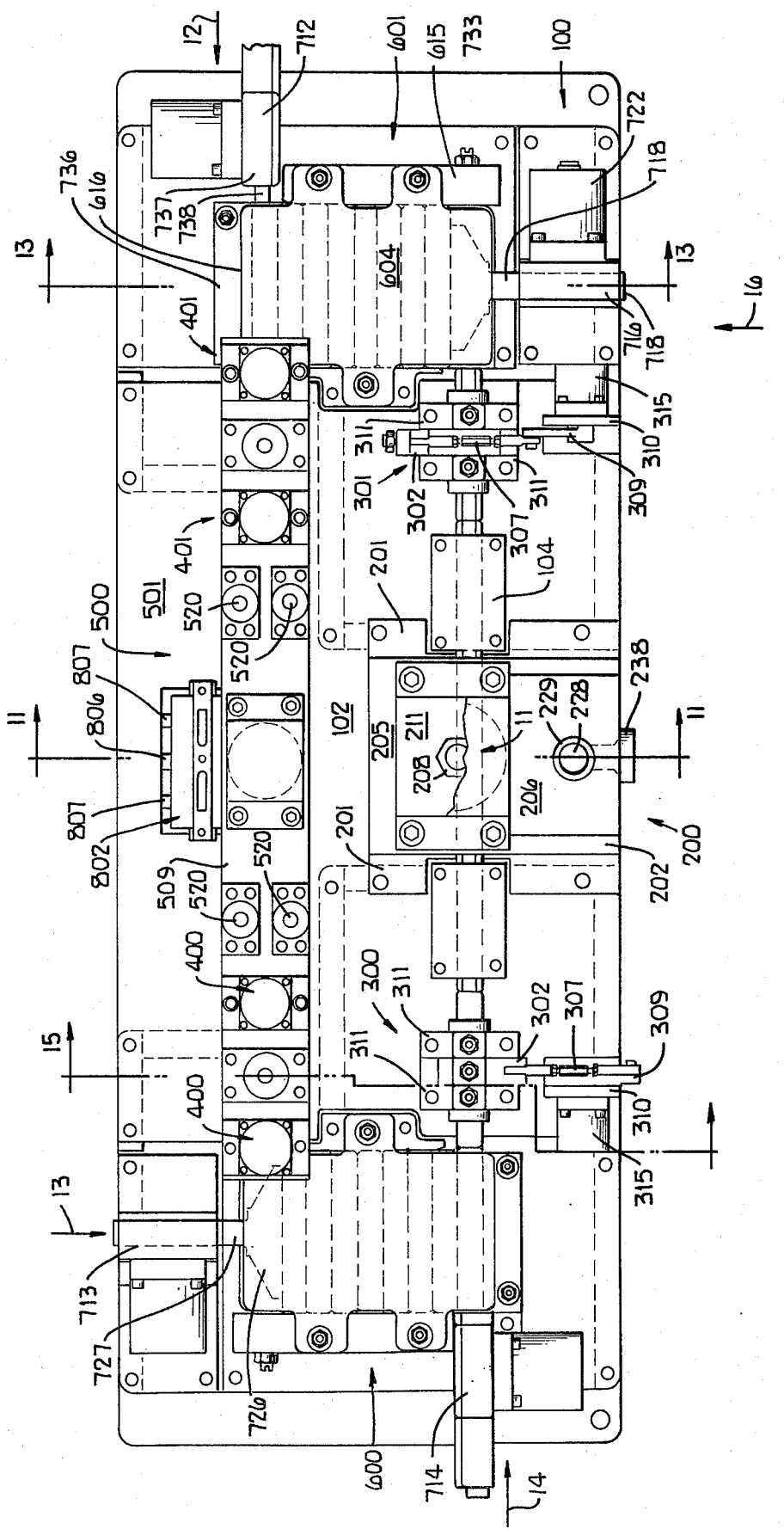
FIG. 8 is a detailed top plan view of the molding apparatus but omitting the mold clamping cylinder and material injection cylinder and mounting plates therefor.
Figure 9:
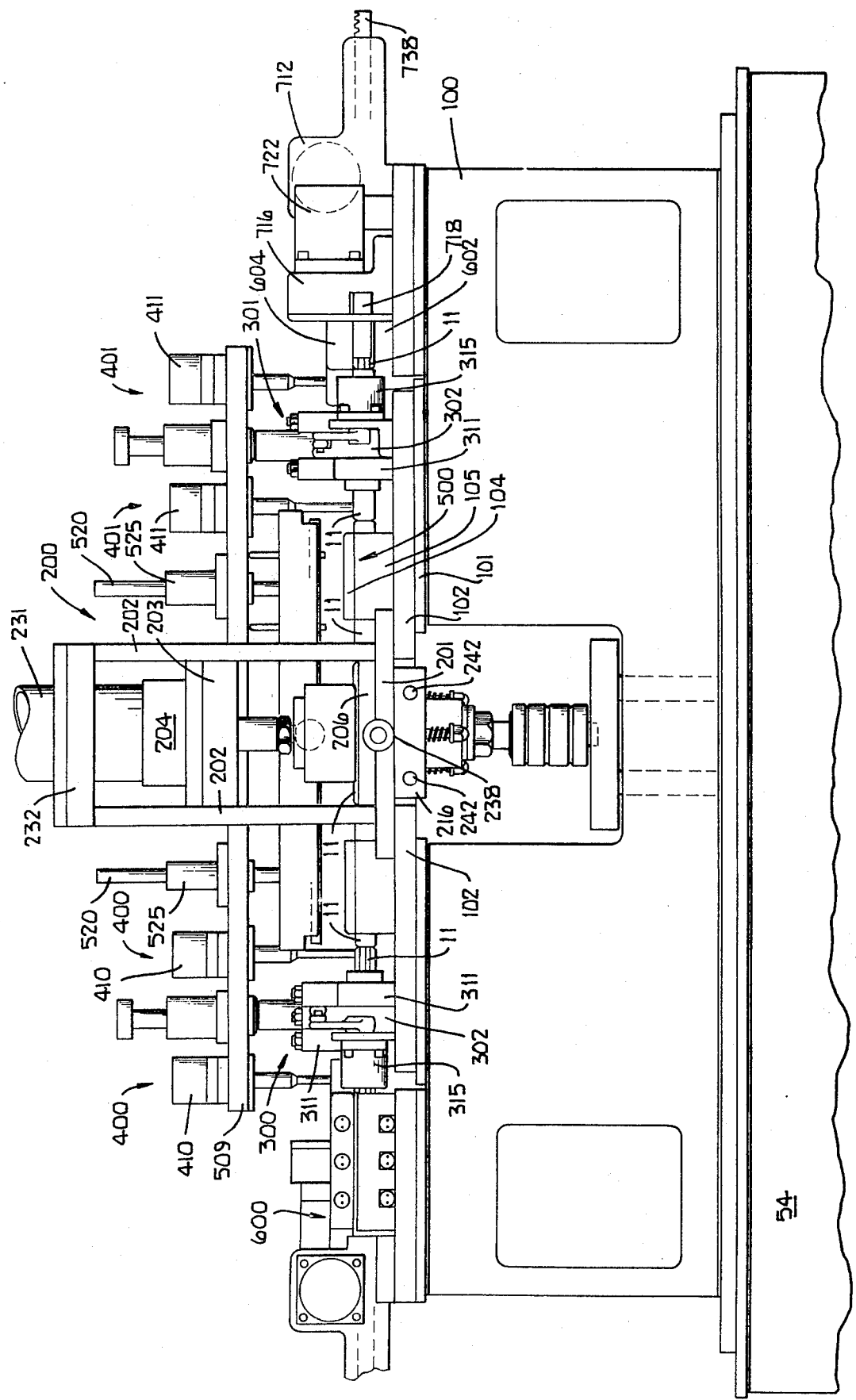
FIG. 9 is a front elevational view of the molding apparatus but omitting the material injection cylinder and associated parts.
Figure 10:
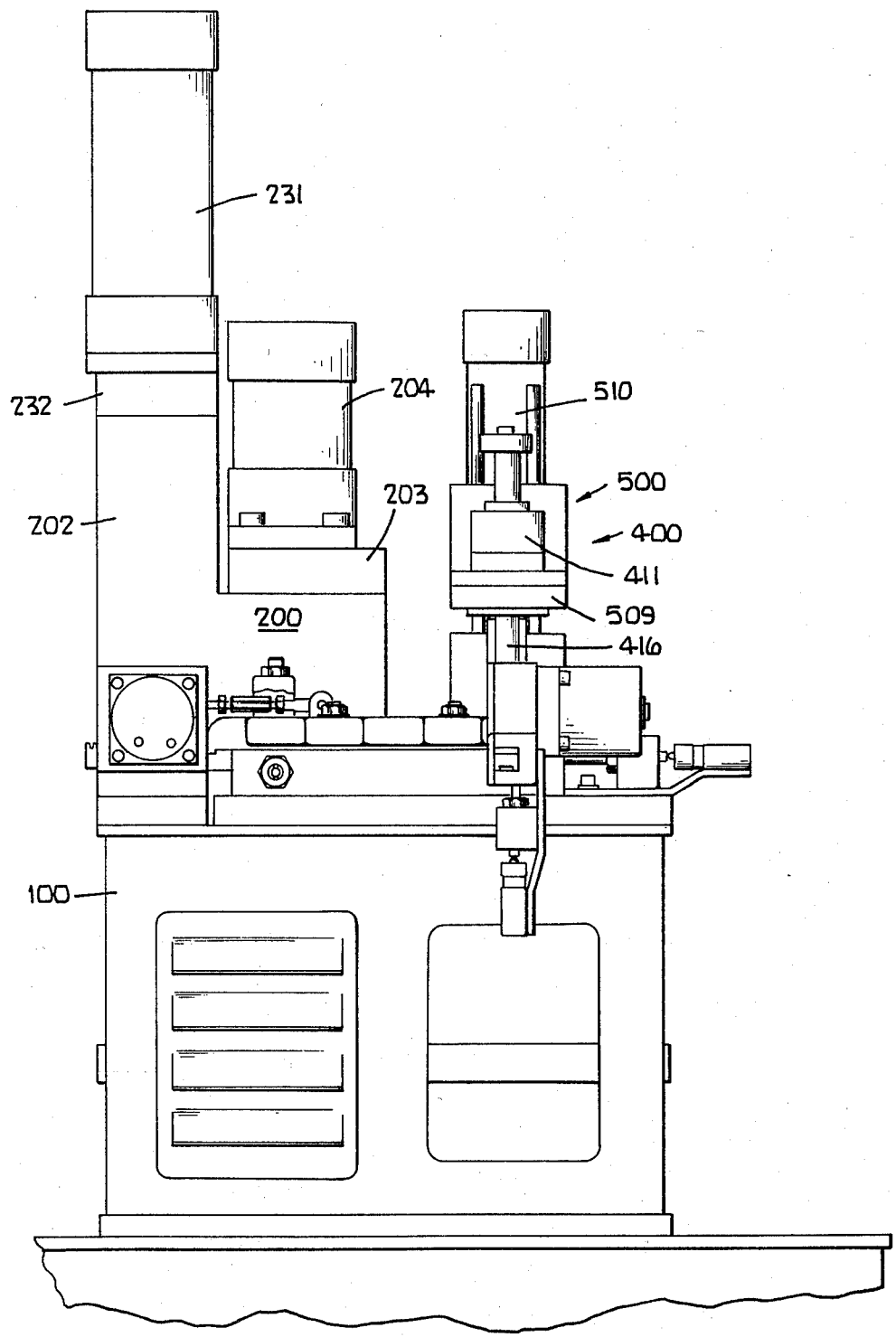
FIG. 10 is a right-hand side elevational view of the apparatus including the clamping and injection cylinders.

Referring now to FIGS. 8, 9 and 10, the molding station or head is shown generally at 200. The mold orientation unit and reorientation unit are shown at 300 and 301, respectively. The mold locking units are shown at 400, and the mold unlocking units 401. The mold opening and ejection unit is shown generally at 500. The heat plate assembly for the pre-heating is shown at 600, and that for the curing area is shown at 601. The rear and front longitudinal transfer units are shown at 712 and 714, respectively, while the left and right transverse or cross transfer units are shown at 713 and 716, respectively. All of this equipment is mounted to a tooling base 100 which is, in turn, mounted to a main base 54. The height of the main base is typically of the order of 28 to 30 inches, and that of the tooling base, approximately 14 inches. The height is a matter of choice but it is believed that these heights will provide good working conditions.

It may be helpful to point out that during transit of a mold in the operating circuit described with reference to FIG. 1, the mold is always in the attitude shown in FIG. 4 except for the time when it is injected with the plastic material in the molding station 200. At that time it is on its side as shown at 11 in FIG. 11 so that the plastic material can be injected from below in accordance with a feature of the present invention. The orientation and reorientation stations mentioned above serve to turn the mold through 90° about its longitudinal axis prior to entry to the molding station, and after departure from the molding station.

Figure 11:
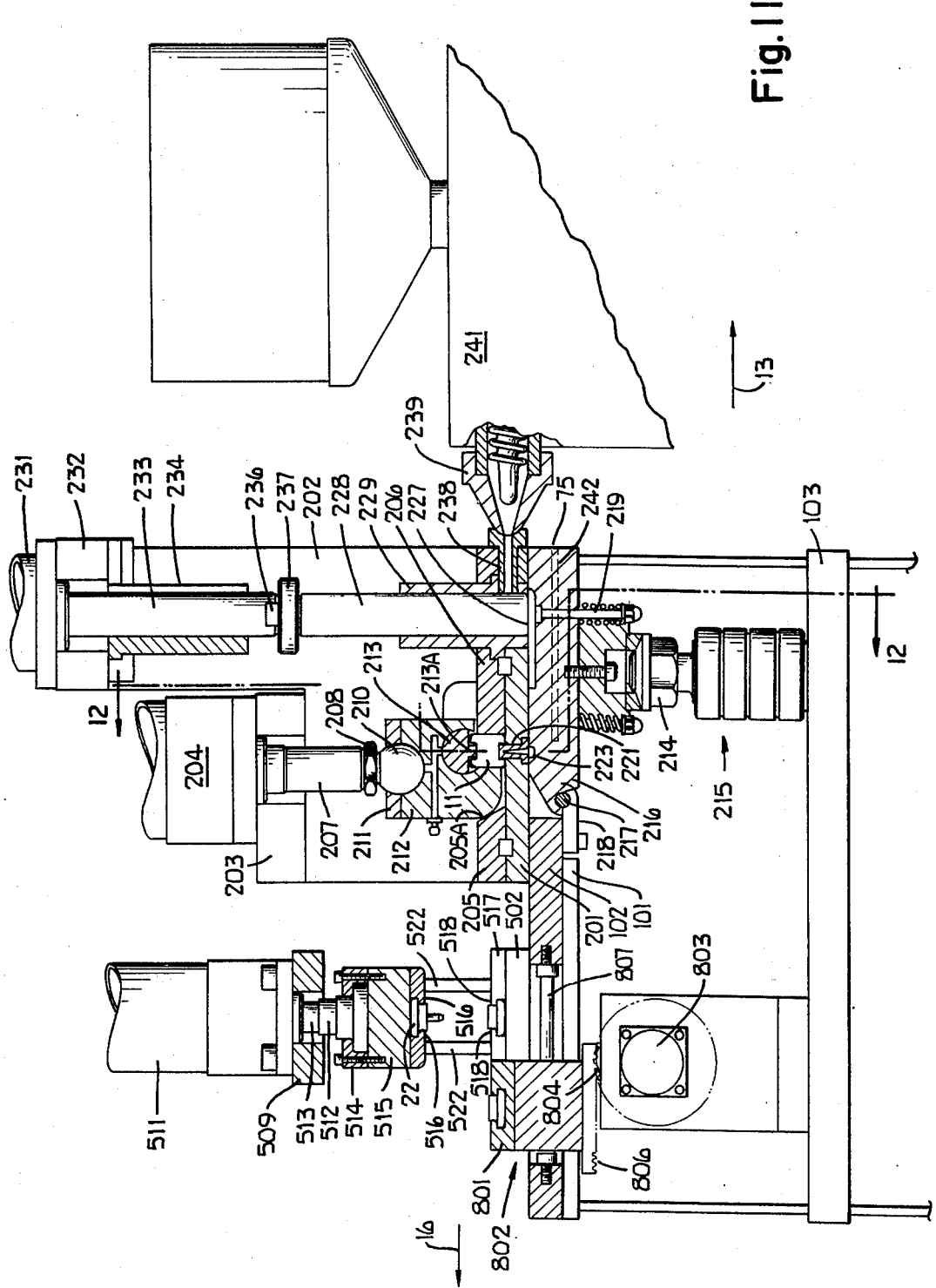
FIG. 11 is an enlarged section taken at line 11—11 in FIG. 8 and viewed in the direction of the arrows, and showing the clamping and injection cylinders and associated parts, and showing fragmentarily the molding material supply apparatus.
Figure 12:
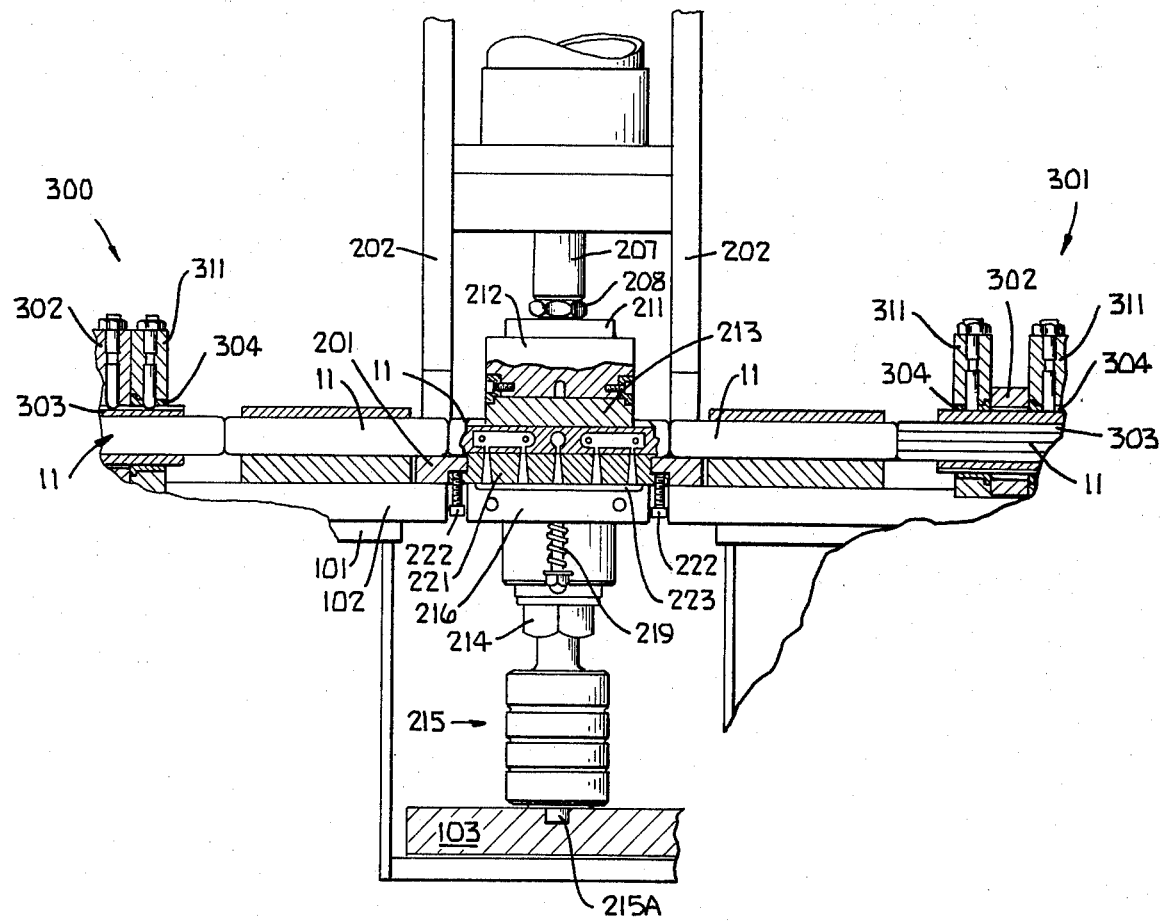
FIG. 12 is a section taken at line 12—12 in FIG. 11 and viewed in the direction of the arrows and showing some features of the nozzle block in the molding head, and limit pins in the orientation stations.

The molding head itself will now be described, as it is one of the most important features of the present invention. Referring particularly to FIGS. 11 and 12, a base plate 201 is affixed to a spacer plate 102 which is affixed to the tooling base top 101. A tool rail 206 is fastened and keyed to base plate 201, and side plates 202 are secured to tool rail 206 and extend upwardly therefrom. A clamp cylinder mounting plate 203 is affixed to the side plates and extends across the space between them. The hydraulic clamping cylinder 204 is secured to plate 203 and the piston rod 207 thereof threadedly receives a large screw therein having as its head the clamp ball joint 210 at the lower end thereof, a lock nut being provided on the screw at 208.

A clamp retainer 211 affixed to clamp 212 cooperates therewith to provide a socket received on the ball 210. A clamp bar 213 is mounted in the clamp 212 and has a tongue portion 213A received in the upwardly facing groove of the mold 11. Because of the semi-cylindrical bearing surface of the clamp bar 213 engaging the matching surface in the clamp 212, the bar can properly orient itself with respect to the mold, while the clamp itself engages the ramp surface 205A of clamp rail 205 and thereby forces the mold against the abutting face of the tool rail 206.

A temperature controlled runner plate 216 is mounted to a hinge pin 217 which is mounted to the hinge clamp plate 218 affixed to the underside of the spacer plate 102. The runner plate is supported tightly against the underside of base plate 201 by a removable support 215 with a screw type leveling adaptor 214 mounted thereon, the bottom of support 215 engaging the upper face of plate 103 affixed to the tooling base. The runner plate support has a lug 215A (FIG. 12) received in a groove in support plate 103 to facilitate positioning of the support with its axis parallel to the centerline of the clamping cylinder and the centerline of the material injection cylinder 231 and the shot transfer plunger thereof which will be described below. Three knockout pins 219 with associated return spring, flat washer and nut, are mounted in the runner plate for easy knock out of the runner in the case of machine shut down or in the event the material cures in the runner plate. A nozzle block 221 projects upwardly through the base plate 201 and into the groove in the underside of the mold 11. This nozzle block is supported in position by the runner plate, and the horizontal flanges at the bottom of the nozzle block engaging the shoulders in the base plate prevent the nozzle block from being pushed too far upwardly by the runner plate. Two screws 222 (FIG. 12) are shown threadedly received in each end flange of the nozzle block and can be used to facilitate removal of the nozzle block from the base plate 201 after the runner plate 216 is swung downwardly from the position shown, as will be described below. It can be seen that the illustrated example of the nozzle block includes five sprue holes, two for each of the large cavities in the mold and one for the small cavity in the mold. These sprue holes are fed by a channel 223 in the upper face of the runner plate, this runner 223 being supplied at its opposite ends by a pair of channel runners 224 and 226 (FIG. 1) diverging from a main channel to form a sort of wishbone or stirrup shaped runner. It can be seen that this is an endless runner and has no dead ends therein. This is of particular advantages in handling thermoset materials, preventing material cure in the runner.

Referring again to FIG. 11, the entrance of channel 227 is below the plunger 228 of the material or shot transfer plunger assembly, this plunger being received and guided in bushing 229 which is mounted in tool rail 206. An injection cylinder 231 is secured to cylinder mounting plate 232 supported by side plates 202 and extending across the space between them. The piston rod 223 extends down through a removable stop sleeve 234 and is connected to a stop 237 threadedly received in the upper end of the plunger 228. Material supply to the chamber below plunger 228 in this illustrated example is received through a bushing 238 fed through a nozzle 239 of an auger feed apparatus 241. It should be understood that other types of feeds can be employed, including a pill transfer feed, or a screw feed whereupon the cylinder 231 and associated components and plunger 228 would be omitted, or by other types of feeding apparatus. The facts that: the present invention involves a continuous process; is virtually runnerless so far as the molds are connected, employs a very short and endless heated runner in the molding head; and injects material upwardly into the mold; makes this invention well adapted to a variety of types of feed with a variety of materials, including thermoset materials.

It was mentioned above that the runner plate is heated. An oil circulating passageway is shown schematically at 242 in FIG. 11 and circulates oil from a supply line 74 (FIG. 17C) through the runner plate to return line 75. The oil is heated to the temperature desired by a thermostatically controlled heater 76 in reservoir 73. The oil is supplied in line 74 by pump 77 driven by motor 78. The circulating oil is to maintain the temperature of the runner plate at the desired level, depending upon the nature of the material being handled. The specific configuration of passageway 242 may depend upon the material used in the runner plate, the material being molded, and the degree of temperature control desired. The oil temperature may be of the order of 100 to 120 degrees Fahrenheit.

Figure 13:
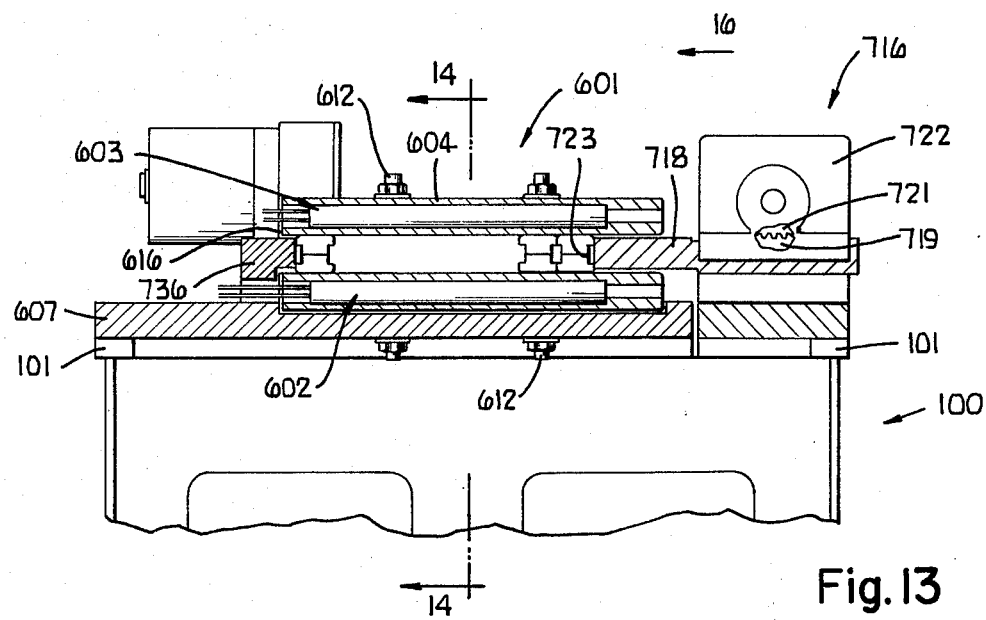
FIG. 13 is a section through the front-to-rear cross transfer unit and curing station taken at line 13—13 in FIG. 8 and viewed in the direction of the arrows, but omitting the structure below the top portion of the tooling base.

Referring now to FIG. 13, there is shown the mold transfer unit 716 pushing molds through the curing unit in the direction of arrow 16. Although there may typically be eight molds in the curing unit as shown in FIG. 1, only three of them are actually shown in FIG. 13. The transfer unit includes a transfer bar 718 having a gear rack 719 in the upper face thereof engaging a gear or pinion 721 on the output shaft of a rotary actuator 722. Rotary actuators suitable for this purpose are well known and widely used and one example would be the model S-250-1V "Rotac" marketed by Ex-Cell-O Corporation 945 East Sater Street, Greenville, Ohio 45331. This particular type is capable of providing rotation of its output shaft through 270°, forward or in reverse, depending upon the direction of application of hydraulic fluid thereto. As indicated at 723 in FIG. 13, the end of the transfer bar directly engages a grooved side of a mold, being in contact with both the cover and the base of the mold.

Figure 14:
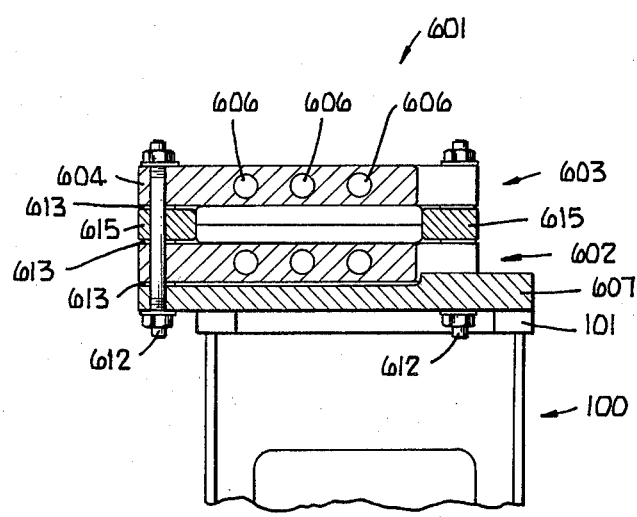
FIG. 14 is a section through the curing station taken at line 14—14 in FIG. 13 and viewed in the direction of the arrows.

Referring further to FIG. 13, the curing unit 601 includes a lower heater assembly 602 and an upper heater assembly 603. These assemblies may be virtually identical and include a heater plate 604 (FIG. 14) having one or more heater elements 606 therein. For convenience of temperature control, electrical elements are preferred, but other types may also be employed. The lower heater assembly may be of the same construction.

The heater assemblies may be secured in place by fastening them to a heater assembly mounting plate 607 affixed to the tooling base top 101. For this purpose, mounting studs 612 are employed. These projects up through the mounting plate 607 and through insulating and spacing washers 613 and through the heater plates and through the side guide rails 615, and are secured by the nuts and lock washers on the opposite ends thereof. The guide rails 615 are appropriately spaced so that the molds can move therebetween without binding but are nevertheless guided thereby. The vertical spacing between the lower face of upper plate 604 and upper face of the lower plate is such as to accommodate free sliding of the molds therebetween as they are pushed incrementally by the transfer unit 716. A combination curing unit end stop and transfer guide rail 736 is shown in FIG. 13 and limits the travel of the pack of molds in the direction of arrow 16 as they are pushed by the transfer bar 718. The construction of the heater assembly for the pre-heat unit 600 is the same as that just described for the curing unit 601, so further description thereof is unnecessary.

Figure 15:
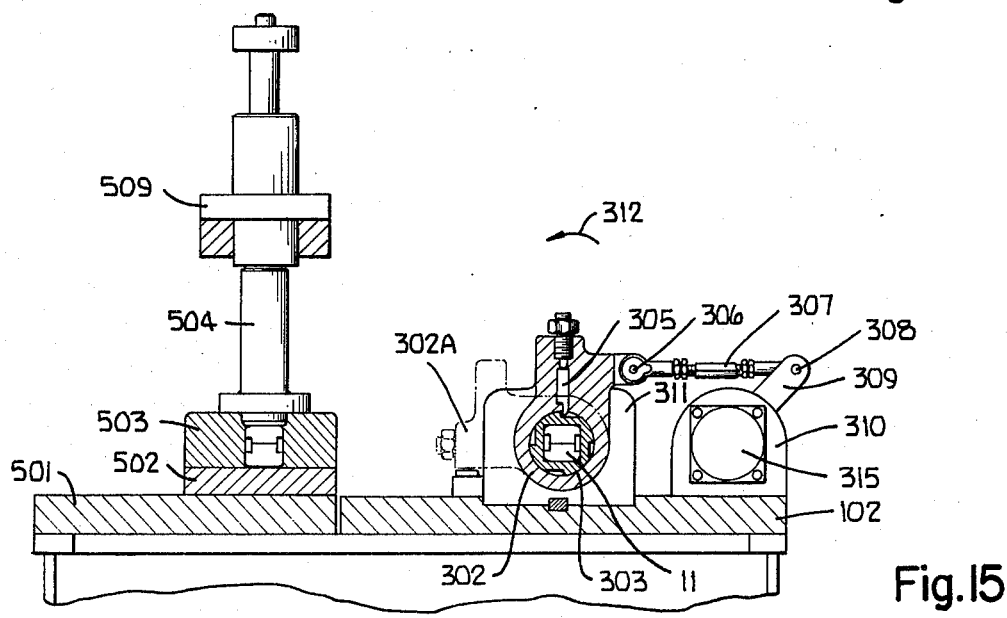
FIG. 15 is a section taken at line 15—15 in FIG. 8 and viewed in the direction of the arrows.

Referring now to the orientation unit 300 of FIG. 9, the description of which will also suffice for the unit 301, specific reference is made to FIGS. 8, 9, 12 and 14. With particular reference to FIG. 15, an orientation housing 302 has an inner cylindrical surface receiving therein the matching cylindrical surface of an orientation bushing 303 which extends throughout the length of the orientation unit and has a rectangular aperture therethrough which receives the mold 11 therein. This orientation bushing 303 is supported in a pair of bearings 304 (FIG. 12) received in and supported by the bearing block 311 which is keyed and affixed to plate 102 which is affixed to the tooling base top 101. It can be seen in FIG. 15 that the outer cylindrical surface of the orientation bushing has four longitudinally extending grooves therein circularly spaced at 90° intervals. The orientation of these grooves is such as to provide a ratchet action in combination with spring loaded pins such as ratchet pin 305. The spring loading of these ratchet pins is provided by Vlier spring plunger units. There is one ratchet pin in each orientation housing, and one ratchet pin in each of the two bearing blocks 311 between which each of the orientation housing is disposed. The spring loading of the ratchet pins by the Vlier plungers is the same in all instances. As shown in FIG. 15, the lower end of each ratchet pin has a round side and a flat side co-operating with the grooves in orientation bushing 303 such that there can be relative rotation between the bushing 303 and the pin mounting means in the counterclockwise direction of arrow 312, but not otherwise. Therefore, the bushing can turn only in the direction of arrow 312, because the ratchet pins in the bearing blocks 311 engaging the flat abutment faces of the longitudinal grooves in the orientation bushings will prevent rotation otherwise.

The orientation housing 302 is connected by a pin 306 to a ball type connector on one end of an adjustable turnbuckle type connector 307, the ball connector on the other end thereof receiving a lever pin 308 secured to the lever arm 309 connected to a rotary actuator 315 mounted to bracket 310. This rotary actuator should be of the double vane type for a 90° rotation, in contrast to the single vane type previously mentioned for 270° rotation for the transfer bar rack drive.

Because the ratchet pin 305 in the orientation housing 302 engages an abutting edge of one of the longitudinal grooves in the orientation bushing 303, each time the rotary actuator is operated through its 90° rotation in the counterclockwise direction of arrow 312, (FIG. 15) the orientation bushing will be turned about its longitudinal axes through an angle of 90°. The adjustable connector on the turnbuckle connectors 307 may be of the "Heim Uniball" type and can be used to provide the necessary adjustment so that when the rotary actuator is at one limit of its travel, the mold in the orientation bushing will be in its upright condition as shown, and when the rotary actuator has been actuated to its 90° limit and thereby the orientation housing 302 moved to the position shown by the dotted outline 302A in FIG. 15, the mold will be turned about its longitudinal axis onto its edge. The rotary actuator, and thereby the orientation housing, is returned to its original condition upon reverse of hydraulic flow thereto. Meanwhile, as will be described hereinafter, a mold will have pushed into or out of the orientation bushing, by the next mold behind it, or by the transfer bar of the transfer unit 714 during a left-to-right longitudinal index or transfer of the molds by that transfer unit.

The mold reorientation unit 301 is constructed in the same manner as orientation unit 300, except it starts from a position corresponding to 302A in FIG. 15, and abutment faces of the spring loaded pins, and of the ratchet grooves face in the direction opposite that in FIG. 15 so that the bushing is turned 90° on its axis, opposite the direction of arrow 312 for each reorientation actuation of the rotary actuator therefor.

Figure 16:
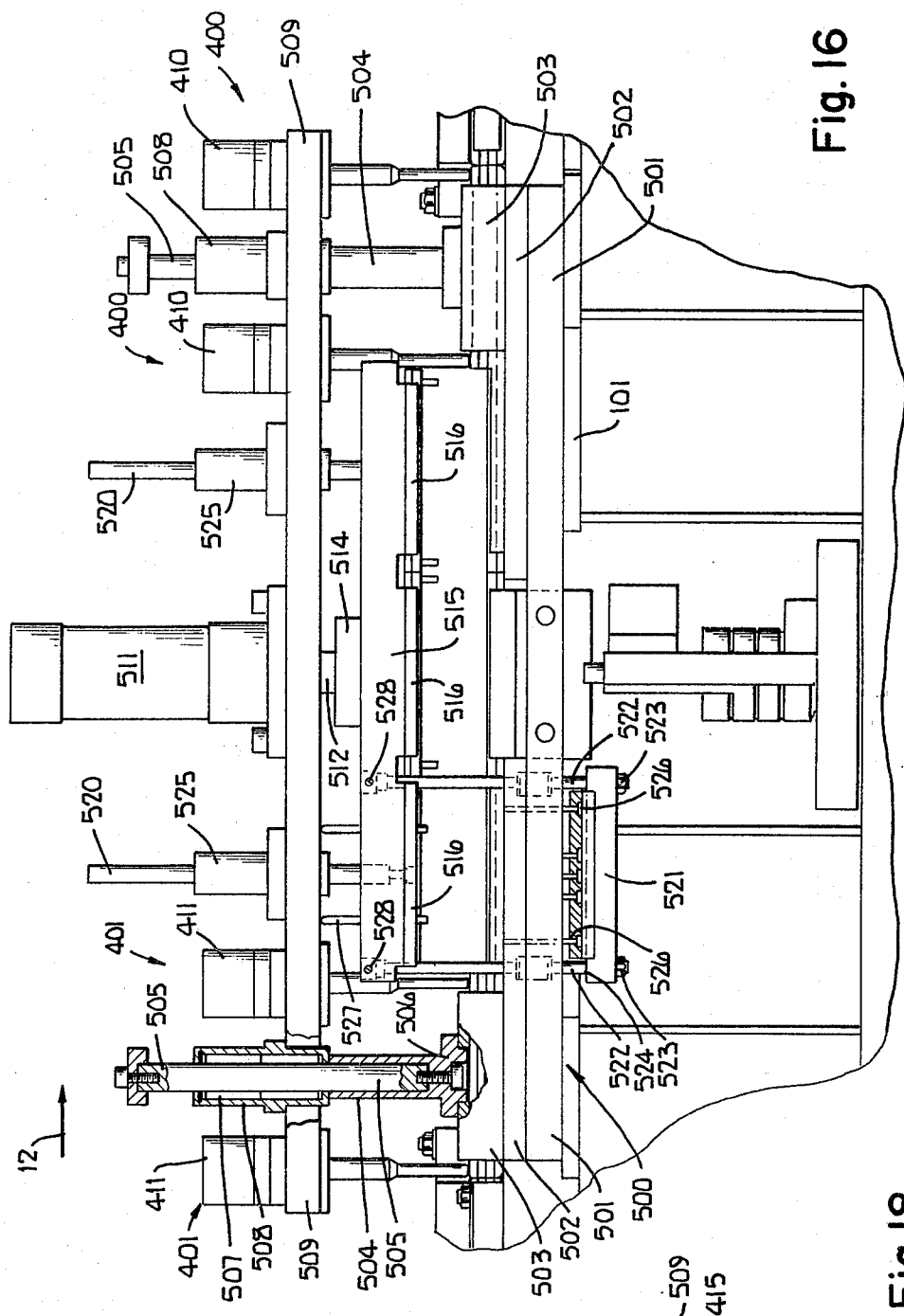
FIG. 16 is an enlarged fragmentary rear elevational view showing three molds open, and showing portions in section to illustrate interior details.

Referring now to FIG. 16, there is shown the mold locking and unlocking units, and the molding opening and part ejection station, the insert loader station, and the mold closing station. A station mounting plate 501 is affixed to the tooling base top 101. Mold support plates 502 are affixed to the station mounting plate and provides a surface on which the molds can slide as transferred by the rear longitudinal transfer unit 712 (FIG. 8). Mold retainer blocks 503 are affixed to the mounting plate 502 and provide the upper and lateral guiding surfaces for the molds as they are transferred through the stations in the direction of arrow 12 by the transfer unit 712. A stop and pin support 504 is affixed to each of the mold retainer blocks 503 and each has a guide pin 505 secured therein as by a screw 506 in the bottom thereof, for example.

A ball bushing 507 is received on each of the pins 505 and is freely slidable vertically thereon. The ball bushings are received in bearing retainers 508 secured to the mold open-close actuator mounting plate 509 to which rotary actuators 410 and 411 and cylinder 511 are mounted.

An adaptor 512 is connected to the lower end of the piston rod 513 (FIGS. 11 and 16) and has a flange at the lower end thereof which supports an adaptor retaining plate 514 which, in turn, supports a mold pick-up block 515 which is affixed thereto. As is best shown in FIG. 11, block 515 has a pair of longitudinally extending gibs 516 fastened on the lower face thereof, the inner edges of the gibs 516 being received under the longitudinally extending flanges 52 (FIG. 4) of the mold cover 22 of the cover half of the mold 11. Thus it will be recognized that the illustrations of FIGS. 11 and 16 shows three molds opened, and the apparatus holding these molds in the open condition.

To retain the lower or ejector half of the mold in the product ejection and mold inspection stations, a mold retainer plate 517 (FIG. 11) is affixed to the mold support plate 502. Retainer plate 517 has longitudinally extending flanges 518 which project over the longitudinally extending upwardly facing flange surfaces 53 (FIG. 4) of the base 23 of the lower half of the mold, retaining it against the support plate 502 as the cover half of the mold is lifted therefrom. A similar function is performed by a gib block 801 on the shuttle block assembly 802 of the insert loader station 800, which will be described hereinafter.

Referring further to FIG. 16, an ejector pin mounting plate 521 is received on the lower end of two pairs of ejector guide pins 522 and is affixed in place by nuts 523 forcing the ejector pin mounting plate 521 against a shoulder on each of the pins as at 524. The guide pins are received in ball bushings mounted in the station mounting plate 501 and retained in this plate by the mold support plate 502. These pins extend upwardly therethrough and at their upper ends the heads thereof are supported in the mold pick-up block 515, and retained there by set screws such as 528.

A set of five ejector pins 526 is secured to the ejector pin mounting plate 521, this being equal the number of ejector pins in the molds being run through the system in this example, where there are five pins in the mold, so there are five pins 526 for ejecting the part from the mold is opened. Because of the size of the drawing, the details of the ejector pins and the part in the mold itself are not shown in FIGS. 11 or 16, as they are well shown in FIG. 3. Ejector pins can also be provided in the mold pick-up block if needed, for actuation against the underside of the actuator mounting plate 509 as the mold opening cylinder opens the mold. An example of such pins is shown at 527, but they are not needed with the molds according to the present example.

Figure 18:
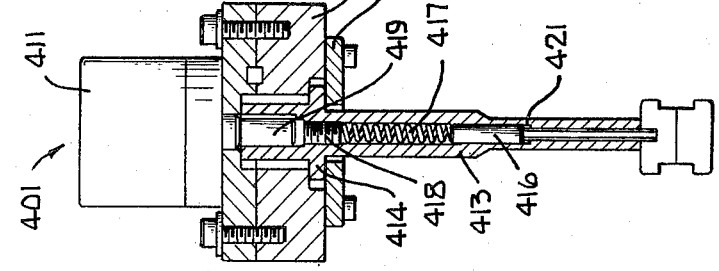
FIG. 18 is an enlarged vertical sectional view of a mold unlocking unit.

Referring to FIG. 18, the unlock unit 401 will be described, and it should be understood that the same description applies to the lock units 400. The unlock unit includes a rotary actuator 411 which is preferably of the single vane, 270° rotation type. It is affixed to the actuator mounting plate 509. The output shaft thereof is keyed to a spindle 413 having a support flange 414 received on bearing plate 415 secured to the underside of the plate 509. A wrench 416 having a lower end configuration matching that of the sockets in the mold lock pins, is secured in the spindle and urged downwardly therein by a spring 417, the upper end of which engages a socket head set screw 418 threadedly received in the spindle under the output shaft 419 of the rotary actuator 412. The downward travel of the wrench in response to urging of the spring 417 is limited by engagement of a shoulder on the wrench with a shoulder in the spindle at 421.

Figure 17A:
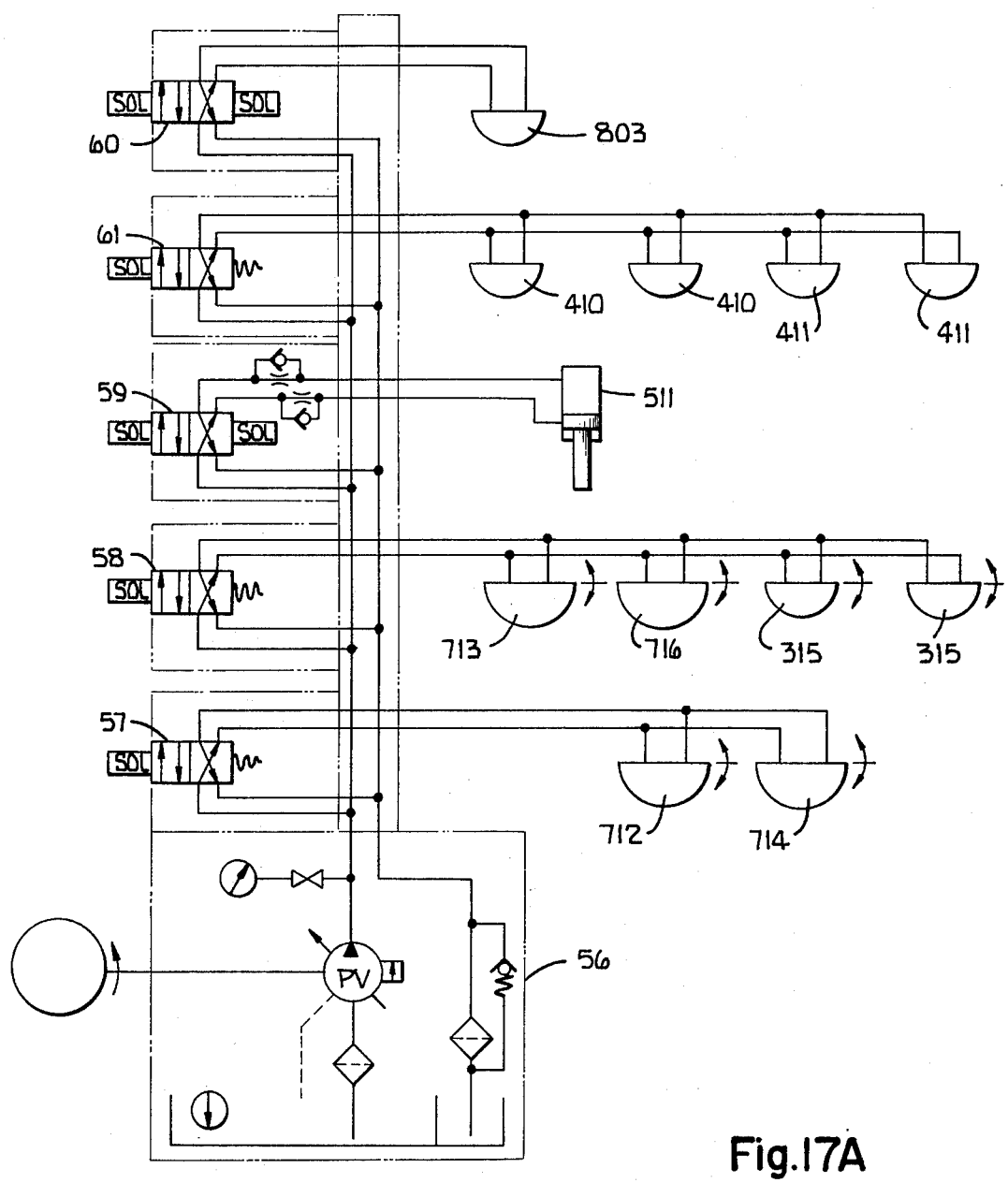
FIG. 17A is a hydraulic schematic diagram of the circuitry for longitudinal indexing, cross indexing, mold orientation, locking and unlocking, opening and closing the insert shuttle block.

Referring now to FIG. 17A, there is shown a hydraulic power unit 56 incorporating a pump, drive motor therefor, and reservoir for hydraulic fluid. Such apparatus is commercially available and one example is the "VariPak" power unit marketed by the Double A Division of Brown & Sharpe Mfg. Co., of Manchester, Michigan 48158. These employ presses compensated vane pumps and, in the illustrated embodiment the pump delivers hydraulic fluid to a set of four two-position valves 57, 58, 59, 60 and 61. Valve 57 controls the direction of application of hydraulic fluid to the longitudinal indexing transfer unit rotary actuators 712 and 714. Valve 58 controls the direction of application of hydraulic fluid to the cross or transverse indexing transfer unit rotary actuators 713 and 716, and to the rotary actuators 315 for the orientation units. Valve 59 controls the direction of application of hydraulic fluid to the mold closing/opening cylinder 511. Valve 61 controls the direction of application of hydraulic fluid to the rotary actuators 410 for the mold locking unit, and to the rotary actuators 411 for the mold unlocking unit. Valve 60 controls the direction of application of hydraulic fluid to the rotary actuator 803 for the shuttle block assembly.

Figure 17B:
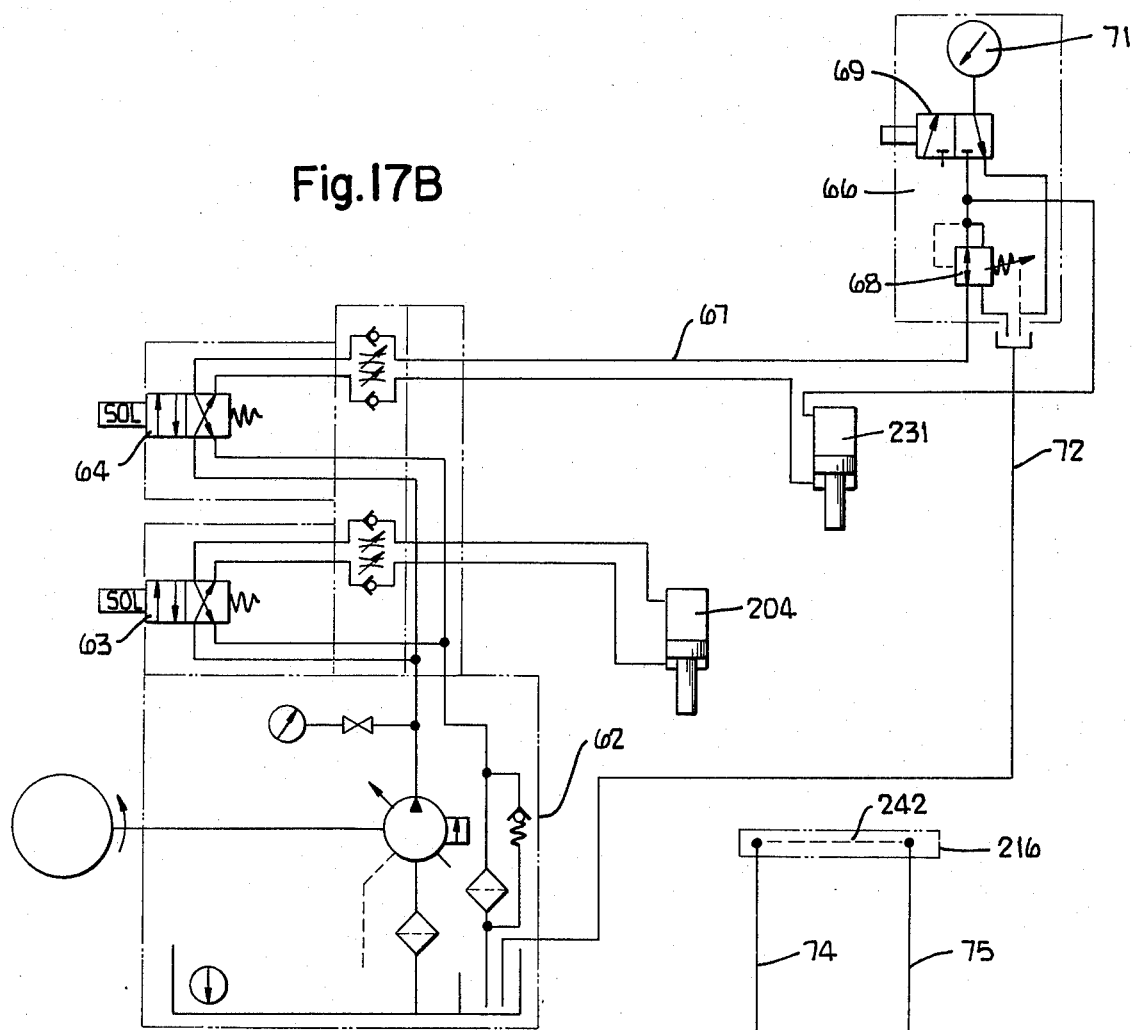
FIG. 17B is a hydraulic schematic diagram of the hydraulic circuitry for the mold clamping cylinder and material injection cylinder, and controls therefor.

Referring now to FIG. 17B, there is shown a hydraulic power unit 62 which may be of the same general type as described above, although the power requirement and pressure rating may be higher, as this unit is intended to provide power for the clamping cylinder 204 and for the material injection cylinder 231. The two position valve 63 controls the direction of application of hydraulic fluid to the clamp cylinder 204, and valve 64 controls the direction of application of hydraulic fluid to the material injection cylinder 231. In both instances, as is true in FIG. 17A for the supply to the mold closing/opening cylinder 511, the hydraulic paths are through adjustable orifices to control the rate of movement of the piston in the respective cylinder. The control apparatus 66 in the supply line 67 to the pressure application side of the injection cylinder includes a pressure adjustment valve 68, pressure gauge 71, sampling valve 69 for gauge 71, and return line 72 to sump.

Figure 17C:
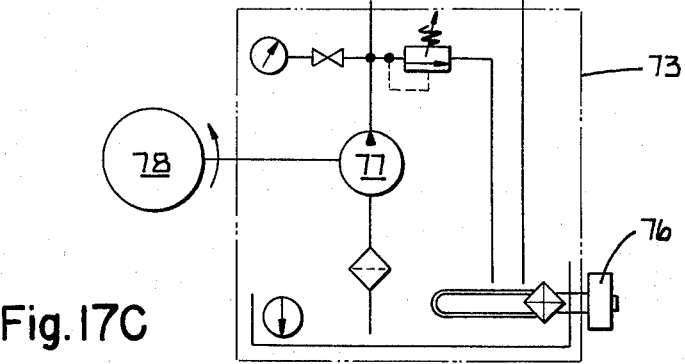
FIG. 17C is a hydraulic schematic diagram for the temperature control system for the temperature controlled runner plate.

FIG. 17C illustrates the apparatus used to provide the oil to the temperature controlled runner plate, and includes the reservoir and pump unit 73 of the type readily available on the market. An example is a PUMPAC unit as marketed by the Brown & Sharpe Hydraulic Division, of Providence, Rhode Island. The pump thereon supplies the oil through line 74 to the passageway 242 in the runner plate 216 from which the fluid is returned through line 75 to the pump. A thermostatically controlled heater 76 is provided to maintain the desired temperature of the oil. The two hydraulic power units of FIGS. 17A and 17B, and the temperature controlling unit of FIG. 17C may all be mounted inside the main base 54 of the machine (FIG. 9), below the tooling base 100.

Some molded plastic parts have inserts therein. An example is a sort of potted electrical component wherein brass contacts or another entity is partially or totally enclosed by plastic in the finished product. The molds incorporating the stick mold concept of the present invention can be employed to mold the parts having inserts therein. To enable an operator or automatic equipment to load inserts, the insert loader station is provided between the eject station and the inspection station. This includes a gib unit 801 in a shuttle block assembly 802. It is similar to the retainer plates 417 described above in that when the upper half of a mold in the insert loader station is raised from the lower half by the mold pick-up block, the gib unit retains the lower half. If inserts are to be loaded, the shuttle drive rotary actuator 803 rotates gear 804 driving the gear rack 806 affixed to the shuttle block to drive it horizontally transverse to the length of the molds, to the open position shown in FIGS. 8 and 11 where an operator or automatic dispenser can place inserts in the lower half of the mold. Then the rotary acutator reverses, to return the loaded mold back into the path of longitudinal transfer of molds along the rear of the machine.

OPERATION

Prior to operation, a proper sprue block 221 is installed to serve the molds to be used. It is inserted in the slot therefor in base plate 201 at the mold head station. The warm runner plate is then raised and clamped into position by the support 215. Proper ejector pin plates (upper and lower as needed) are installed at the eject station. If automatic insert loading is to be employed, the tooling necessary to deposit inserts into the mold at station 800, is installed.

All of the foregoing is done with the machine shut down. Likewise the twenty-six molds can be loaded into the machine cold, while it is shut down. The molds are loaded in the unlocked condition. This can be done conveniently by hand, inserting them between the mold head and reorientation station, with the cover plate 104 of guide block 105 temporarily removed for admission of the molds at this point. The molds can be pushed around the loop by hand. When the 26 molds are being loaded, care must be taken to be sure that all have correct orientations depending upon the stations at which they are located when loading is complete. For example, those in the four positions along the front, to the right of the orientation station, should be on edge, with the gate opening or openings down.

Then the heater units for the pre-heat and curing stations and for the runner plate heating oil can be activated. During the warm-up period, molds may be cycled through the machine, without activation of the mold head, unlock, eject, insert load, inspect, and mold lock, stations. Once everything is up to temperature molding operations can begin. Reference to the operational sequence illustrated in FIG. 19 may be helpful.

In the example there illustrated, a six second cycle time is provided. The cycle time is initiated by an operator at the insert loader actuating palm buttons or other means to push the shuttle block and mold thereon into the rear line. Immediately following the return of the shuttle block a one second interval is provided for indexing. This means that each of the molds is advanced one position in the circuit during this one second.

Figure 19:
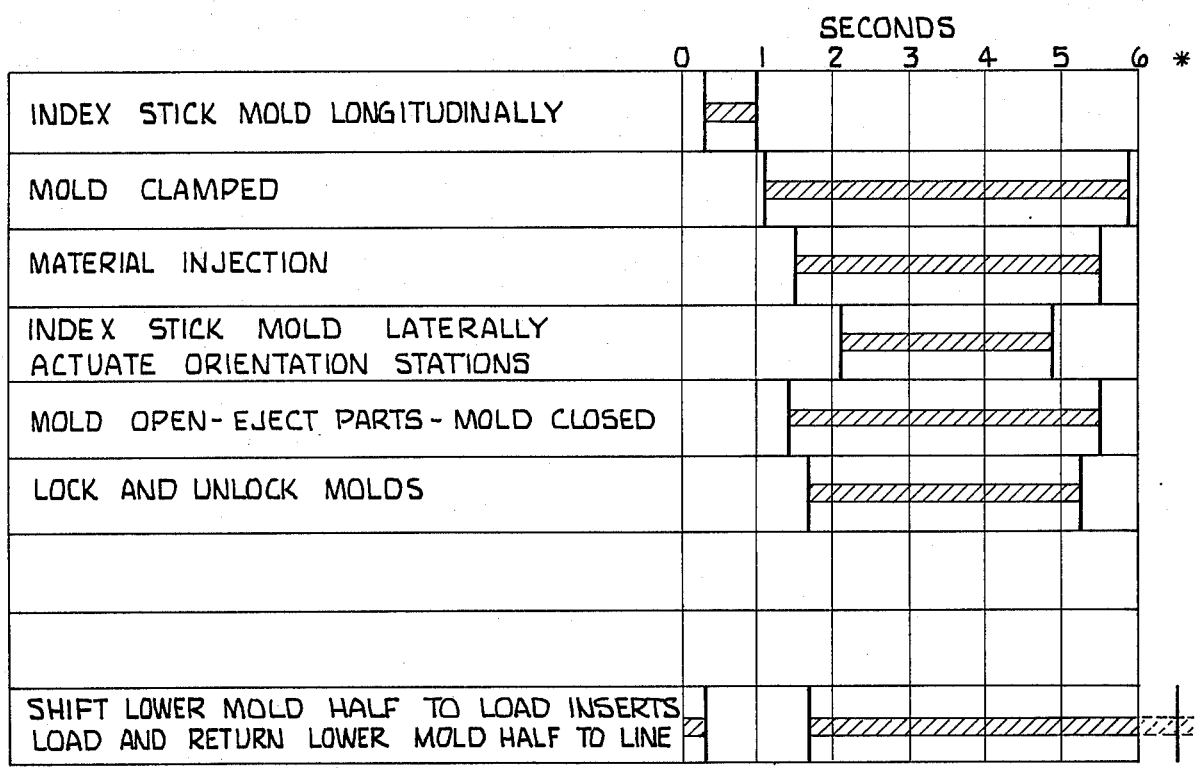
FIG. 19 is an operational sequence chart.

Now referring further to the operational sequence chart of FIG. 19 and considering that after the first second, all the transfer units are at rest, the mold clamping cylinder 204 is applied to clamp the mold 11 against the nozzle block 221 (FIG. 11) and 12). Shortly thereafter, and during the second second in the cycle, the material injection cylinder is energized to drive the plunger 228 downwardly and thereby drive a shot of molding material through the runner 227 and 223 into the nozzle block 221 from which it is delivered through the sprues therein and gates of the mold to the three cavities therein. This operation may occur during the second through fifth seconds in the cycle. Meanwhile, during the third through fifth seconds, the orientation stations 300 and 301 are activated. Station 301 serves to turn the mold from its orientation in FIG. 4, for example, onto its side with the gate openings therein downward so that, when it is shifted into the molding head 200, during the first second of the next cycle, it will move directly into the proper position on the nozzle block for registry of the gates in the mold with the sprues in the nozzle block. At the same time that orientation unit 300 is performing this function, orientation unit 301 is turning the mold therein through 90° about its axis in the direction opposite the direction of orientation unit 300, to return the mold in unit 30 to the original attitude it had when it left the pre-heat unit and entered orientation unit 300. Therefore this mold is ready for transfer into the curing unit.

Also during the second through fifth seconds of the cycle, the mold opening cylinder 511 is actuated to retract the piston rod 513 thereof. This permits the actuator mounting plate 509 to descend until the lower ends of the bearing retainers 508 engage the upper ends of the pin support and stop members 504. This serves to limit the downward travel of the actuator mounting plate. At this point, the wrenches of the mold unlocking and locking units have entered the sockets in the heads of the two lock pins of the two molds associated therewith. For example, the wrenches of the mold unlock units 401 have entered the sockets of the lock pins in the mold in that station, and the wrenches of the lock units 400 will have entered the lock pins of the mold in the lock station. After the wrenches have entered, the rotary actuators 411 and 410 are energized in the appropriate respective directions for unlocking a mold by the actuators 411 and for locking a mold by the units 410. Meanwhile, once the actuator mounting plate 509 has come to rest in its downward descent by the engagement of the bearing retainer lower ends with the upper ends of the stop members 504, further retraction of the piston rod 513 will lift the mold pick-up block 515 and thereby separate the cover half of the mold from the ejector half, not only in the eject station, but also in the insert-load station, and in the inspection station. As the pick-up block rises, it is guided on the four guide rods 520 received in ball bushings in bearing retainers 525, secured in plate 509. As the pick-up block rises, it will raise the ejector pin mounting plate by means of four guide pins 522 extending through four ball bushings secured in the station mounting plate 501 by the mold support plate 502. The upper ends of these pins 522 are retained in the pick-up block and the lower ends secured to the ejector pin mounting plate 521. The ejector pins will eject from the ejector half of that mold, the three parts in the cavities thereof. Then, if insert loading is to be accomplished, the shuttle block assembly 802 (FIGS. 8 and 11) is driven rearwardly transverse to the path of molds during normal transfer along the rear leg of the circuit, to the position shown in FIGS. 8 and 11 where the lower half of the mold therein is exposed in the gib block 801 so that the operator can load inserts in the cavities in the mold. The transverse drive in the direction of arrow 16 is accomplished by the shuttle drive rotary actuator 803 having a gear 804 thereon driving the rack 806. The shuttle block assembly is supported on a pair of bearing rods 807 secured to the machine and receiving thereon ball bushings mounted in the shuttle block assembly. Immediately following loading of the inserts, the shuttle drive rotary actuator 803 reverses, returning the shuttle block assembly in the direction of arrow 13 into position placing the mold half therein directly under the upper half and in line with the other molds on the rear leg of the mold transfer circuit. It will be readily recognized that where manual loading of inserts is to be accomplished, it may be desirable as a safety measure to have the control of rotary actuator 803 directly responsive to operation of a pair of palm buttons so that both hands of the operator will be out of the way and resting on respective palm buttons before the rotary actuator can return the shuttle block assembly and permit the operating sequence to continue.

Following return of the shuttle block assembly to position under the actuator mounting plate, the energization of the mold open cylinder 511 will reverse in direction, whereupon the pick-up block 515 will descend and again close the upper half of the mold with the lower half thereon. Upon further extension of the piston rod 513, once the molds can be no further closed, the reaction of the cylinder is to lift the actuator mounting plate 509 (and the lock and unlock units therewith) until the upper ends of the bearing retainers 508 rise into abutting engagement with the stops 519 affixed to the top of the pins 505. During this operation, the wrenches have been fully withdrawn from the molds and the molds are then free to be transferred longitudinally by the transfer unit 712. This entire operation of opening the molds, ejection of parts, insert loading (when used) reclosing the molds, and lifting the lock and unlock units occurs between the first and the end of the sixth second in the operation cycle. Then, the system is ready for transfer of molds one step through the circuit by the four transfer units during the first second of the next cycle.

Once the molding operation is completed, the auger feed apparatus 241 can be moved away and the bushing 238 can be removed and cleaned. An important feature of the present invention is the fact that the temperature controlled runner plate 216 can be readily cleaned. For this purpose, the nut on the leveling adaptor is loosened and the removable support 215 is removed from the support plate in the direction of arrow 13 in FIG. 11. The runner plate can then swing down around the hinge pin 217, and any material in the runner will either fall out or can be knocked out by hitting the knockout pin 219 with a hammer. Also the nozzle block can then fall out or it can be forced out by turning inward the screws 222 (FIG. 12) to push the nozzle block downward out of its receiver in the base plate 201. Any residual plastic material therein can be removed or the nozzle block can be replaced, if desired, with another nozzle block, to run the same parts the next time, or with a nozzle block having a different arrangement of sprue holes therein to run parts in molds having a different arrangement of cavities, gates, or the like. Once a new nozzle block, or the same nozzle block is put back in place, the runner plate can be swung back up against the nozzle block and against the bottom of the base plate 201 and securely supported in place by again replacing the removable support 215 and tightening the nut thereon. When the system is at the desired temperature, it is then ready to run more parts. Of course it should be understood that even after injection of material is terminated at the end of operation of the machine, the molds can continue to be circulated through the system until all of the molds with material in the cavities thereof have been moved to the mold opening and closing station, and the parts ejected from the cavities thereof.

It will readily be recognized that for a machine of this type to operate automatically successfully, numerous limit switches may be employed to sense the achievement of various functions such as transfer of molds, closing of molds, opening of molds, orientation of molds, return of the shuttle assembly, clamping of the mold in the molding head, and the like. Also a variety of lamps and switches may be employed to indicate that various operations have been achieved, or temperatures reached, or troubles exist. All of these details can be worked out readily by one skilled in the art, once the basic invention has been disclosed as it has hereinabove. Therefore, while a few limit switches are shown in some of the drawings herein, most are omitted in order to avoid cluttering the drawings with features not in themselves a part of the invention. Also it may be recognized that the use of the tooling base top as a foundation for various mounting plates, with appropriate spacing between each mounting plate and the next, permits some linear adjustment to be made both longitudinally and transversely to enable a machine of a basic size to be adapted to some variation in mold sizes, particularly in lengths of molds. In other words, the pre-heat and curing units can be moved somewhat farther apart than shown, to accommodate longer molds in the longitudinal runs of the circuit. Similarly the longer molds on the rear longitudinal run can be accommodated by simply removing the entire actuator retainer plate and possibly the ejector assembly and replacing them with longer units to accommodate the additional length of molds.

It will also be recognized that the time periods and temperatures where suggested above may vary somewhat, depending upon materials used, and the like. Therefore while the invention has been disclosed and described in some detail in the drawings and foregoing description, they are to be considered as illustrative and not restrictive in character, as other modifications may readily suggest thermselves to persons skilled in this art and within the broad scope of the invention.

The invention claimed is:

1. A molding head comprising:

mold holding means having a mold receiving space therein adapted to receive complete molds in the space sequentially for filling sequentially with material to be molded;

a runner member separate from said holding means and said space and having material inlet means and material outlet means and a passageway communicating between said inlet means and said outlet means;

means supported in position by said runner member and providing communication between said runner member outlet means and said mold receiving space and having at least one material conveying hole therethrough, with the lower end of the hole in registry with at least a portion of said outlet means for supply of material upwardly from said outlet means portion through said hole to a mold in said mold receiving space, said hole being of decreasing cross-sectional area at increasing distances from the lower end of the hole toward the upper end of the hole;

and temperature maintaining means on said runner member, said runner member being separable from said communication providing means, for cleaning.

2. A molding head comprising:

mold holding means having a mold receiving space therein adapted to receive complete molds in the space sequentially for filling sequentially with material to be molded;

a runner member separate from said holding means and said space and having material inlet means and material outlet means and a passageway communicating between said inlet means and said outlet means;

means supported in position between said runner member and said mold receiving space and providing communication between said runner member outlet means and said mold receiving space and having at least one material conveying hole therethrough, with the lower end of the hole in registry with at least a portion of said outlet means for supply of material upwardly from said outlet means portion through said hole to a mold in said receiving space, said hole being of decreasing cross-sectional area at increasing distances from the lower end of the hole toward the upper end of the hole;

and temperature maintaining means on said runner member, said communication providing means including a nozzle block mount, and a nozzle block in said mount, said hole being a sprue located in said block and said block having an upper surface exposed in said mold receiving space to receive on said surface and thereby support a mold clamped against said surface for supply of material directly from said sprue to a gate in a mold clamped against said surface.

3. The molding head of claim 2 wherein:

said runner member engages the underside of said nozzle block, and said nozzle block has at least one additional sprue therein of decreasing cross-sectional area at increasing distances from the underside of the nozzle block, and said outlet means communicates with said sprues in said nozzle block to supply material upwardly through said sprues.

4. The molding head of claim 3 wherein:

said nozzle block is smaller at its upper end than it is therebelow, whereby said nozzle block is insertable into said mount from below and movable upward therein until seated against a stop, said holes being conical and tapering to small areas at said upper surface of said block to minimize resistance of spure material in said holes to shearing at said upper surface upon movement of a mold horizontally along said upper surface out of said space after supplying material to the mold from said holes.

5. A molding head comprising:

mold holding means having a mold receiving space therein adapted to receive complete molds in the space sequentially for filling sequentially with material to be molded;

a runner member separate from said holding means and said space and having material inlet means and material outlet means and a passageway communicating between said inlet means and said outlet means;

means supported in position between said runner member and said mold receiving space and providing communication between said runner member outlet means and said mold receiving space;

temperature maintaining means on said runner member;

said communication providing means including a nozzle block mount, and a nozzle block in said mount, said nozzle block having sprues therein;

said runner member engaging the underside of said nozzle block, and said outlet means communicating with said sprues in said nozzle block to supply material upwardly through said sprues;

said nozzle block being smaller at its upper end than it is therebelow, whereby said nozzle block is insertable into said mount from below and movable upward therein until seated against a stop;

said mount being a plate having a slot therein disposed under and in registry with said mold receiving space, said slot having lateral extensions at the bottom thereof to provide downwardly facing shoulders in said mount plate and serving as said stop;

and said nozzle block having a body portion fittingly received in said slot, and a laterally extending flange received in said slot extensions and having an upper face seated on said shoulder.

6. The molding head of claim 5 wherein:
said runner member retains said nozzle block in said mount plate.

7. The molding head of claim 6 wherein:
said runner member is a plate hinged to said mount plate and swingable downwardly and away from said nozzle block to facilitate removal of said nozzle block from said mount plate.

8. A molding head comprising:
mold holding means having a mold receiving space therein adapted to receive complete molds in the space sequentially for filling sequentially with material to be molded;

a runner member having material inlet means and material outlet means and passageway means communicating between said inlet means and said outlet means;

a base member between said runner member and said mold holding means and having a removable nozzle member therein, said nozzle member having at least one hole therein providing communication between said runner member outlet means and said mold receiving space;

and temperature maintaining means on said runner member;

said nozzle member having a surface facing said material outlet means and serving as one wall thereof, and said base member having a surface facing said passageway means and serving as one wall thereof.

9. The molding head of claim 8 wherein:
said runner member and said base and nozzle members are separable at said facing surfaces to facilitate removal of raw material from said inlet means and said passageway means and said outlet means.

10. The molding head of claim 9 wherein:
said outlet means is elongated and open at said facing surface of said nozzle member;

said passageway means is curved and communicates with said outlet means at both ends of said passageway means and said outlet means;

and said inlet means communicates with the center of said passageway means.

11. The molding head of claim 10 wherein:
said inlet means and said passageway means are in the form of a wishbone to avoid any stagnant locations in the raw material flow path between said inlet means and said outlet means.

12. The molding head of claim 9 wherein:
said runner member has an upper face; and
said outlet means, said inlet means and said passageway means are grooves in said face; and said facing surfaces of said nozzle member and said base member face downwardly; and said face of said runner member faces upwardly, and said grooves are covered by the said downwardly facing surfaces 13. The molding head of claim 12 wherein:
said runner member is hinged to said base member to swing downwardly for facilitating cleaning of said grooves.

14. The molding head of claim 13 wherein:
the hinged connection includes a hinge pin connected to said base member, and the hinge posts in said runner member are semi-cylindrical, facilitating direct removal perpendicular to the hinge pin axis when said runner member has been swung downwardly.

15. In a molding head, mold holding means comprising:
horizontal base surface means and vertical wall surface means disposed in horizontal and vertical intersecting planes, respectively, and providing bottom and side abutments for engagement by horizontally extending surfaces of a mold and thereby serving as mold locating surfaces; and clamp means oriented to force a mold against said base and wall surfaces during introduction of material into said mold, said clamp means including self alignment means to align said clamp means with the mold as said mold is forced against said surfaces, said self alignment means including a clamp block, a clamp bar engageable with a mold and pivotally mounted in said clamp block, and a ball connecting said clamp block to a clamp actuator.

16. The combination of claim 15 wherein said clamp means include:
a clamp block camming member having a camming face engaging said clamp block, the locations and orientation of said clamp actuator, said camming face, said clamp bar, and said base and wall surfaces being such that, as said actuator drives said clamp block and said clamp bar therewith toward one of said surfaces, said camming face cams said clamp bar toward the other of said surfaces.

17. The combination of claim 16 and further comprising:
a mold clamped by said clamp means, said mold having downwardly facing and upward facing grooves in downward and upward facing surfaces thereof, respectively;

said clamp bar having a rib received in said upward facing groove; and nozzle means projecting through said base surface and into said downward facing groove and sealed against said mold when said mold is clamped by said clamp block, to conduct without leakage, a material to be molded, from said nozzle means into said mold.

18. The apparatus of claim 17 and further comprising:

a removable temperature-controlled material conveying runner disposed under and supporting said nozzle means and holding said nozzle means against said mold, and conveying to said nozzle means, the material to be molded.

19. The combination of claim 18 wherein:

said mold is an elongated, stick-like mold, and said grooves extend lengthwise therein.

* * * * *